United States Patent [19]

Knowles

[11] 4,290,276
[45] Sep. 22, 1981

[54] VALVE WITH FRANGIBLE CLOSURE

[75] Inventor: Steven M. Knowles, Jackson, Mich.

[73] Assignee: Aeroquip Corporation, Jackson, Mich.

[21] Appl. No.: 90,396

[22] Filed: Nov. 1, 1979

[51] Int. Cl.³ ............................................. F25D 19/00
[52] U.S. Cl. .................... 62/299; 137/68 R; 285/3; 62/77
[58] Field of Search ............... 137/68, 72, 74; 62/77, 62/298, 299; 285/3

[56] References Cited

U.S. PATENT DOCUMENTS

| | | | |
|---|---|---|---|
| 243,847 | 7/1881 | Burritt | 137/74 X |
| 2,608,201 | 8/1952 | Henry | 137/68 R |
| 2,782,496 | 2/1957 | Augustavskas | 137/74 X |
| 2,933,333 | 4/1960 | Bredtschneider | 137/68 R X |
| 3,219,047 | 11/1965 | Kircher | 137/68 R |
| 3,397,712 | 8/1968 | Boroson | 137/68 R |

Primary Examiner—Harold W. Weakley
Attorney, Agent, or Firm—Beaman & Beaman

[57] ABSTRACT

A valve member fitting utilizing a frangible closure wherein the fitting may be used with precharged conduits such as employed in the refrigeration arts. Additionally, the invention relates to fitting for precharged conduit systems utilizing frangible closure elements. A frangible valve element seals the passage of a valve, or conduit, and includes an axial portion engagable by a radially movable actuator capable of engaging the valve element and shearing a frangible web to completely remove the valve element from the flow passage, and a valve element receptacle retains the severed valve element. The valve is characterized by its economy of manufacture and absence of flow restriction.

17 Claims, 6 Drawing Figures

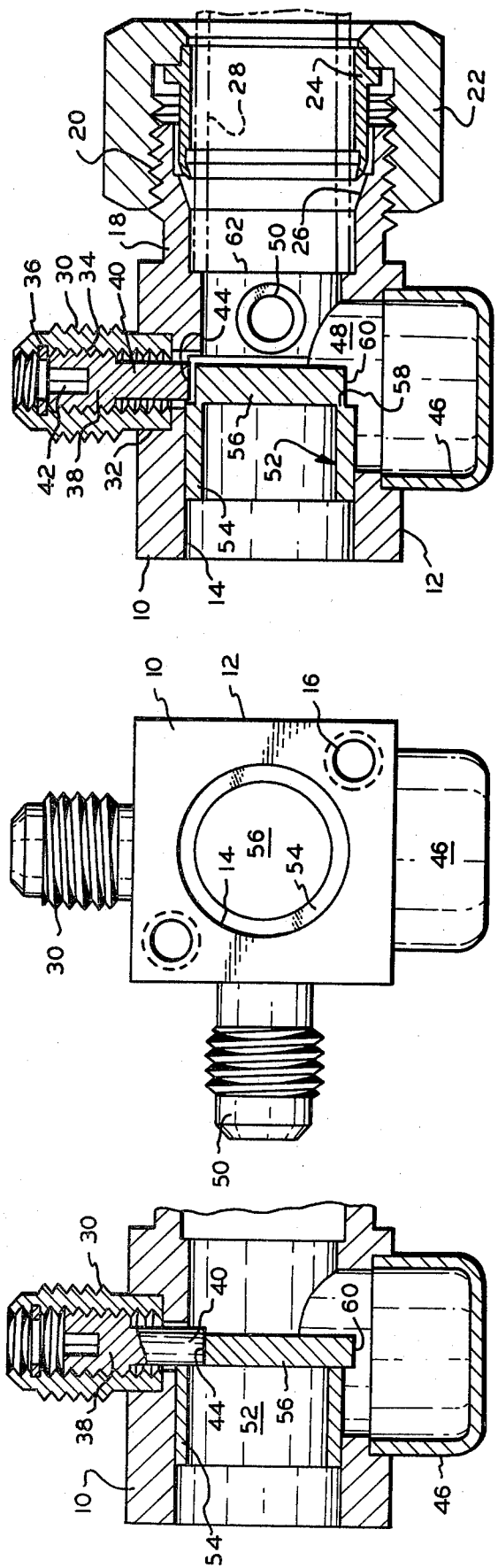
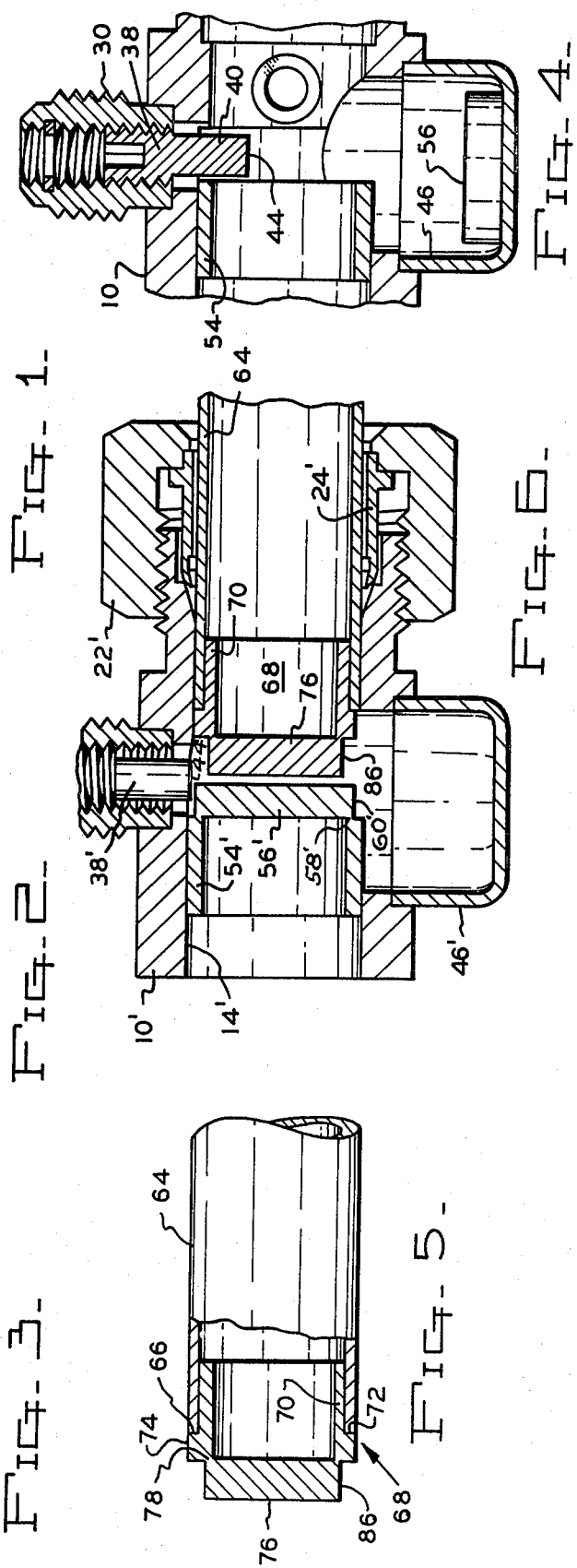

VALVE WITH FRANGIBLE CLOSURE

BACKGROUND OF THE INVENTION

In the refrigeration arts it is common to utilize refrigeration circuit components which are precharged with refrigerant. For instance, in a central air conditioning system consisting of an evaporator coil unit and a compressor-condensor coil unit which are remotely spaced, such coil units are interconnected by conduits, and for ease of installation the coil units and conduits are precharged with refrigerant and the components handled and shipped separately. The coil units and conduits are provided with fittings having rupturable diaphragms which are pierced by fitting structure as the components are interconnected and are commonly called "one-shot" couplings. Examples are shown in U.S. Pat. No. 2,933,333 and the assignee's U.S. Pat. No. 3,202,442.

Prior rupturable diaphragm "one-shot" couplings have the disadvantage of being relatively expensive to manufacture, require special manufacturing techniques, produce loose fragments or have poor fluid flow characteristics producing relatively high restriction to fluid flow therethrough. As the sealing of conventional "one-shot" couplings is accomplished by a thin diaphragm, and as the diaphragm is pierced by a member on the mating coupling parts, the ruptured diaphragm includes ragged and sharp edges, deformed severed diaphragm segments, a loose fragment which may interfere with flow and often an irregularly shaped flow orifice. Further, the piercing implement often remains centrally located in the flow path. Thus, considerable restriction and turbulence is created by known "one-shot" couplings and fittings.

It is an object of the invention to provide a valved fitting for use with precharged conduit systems which may be economically manufactured, and is capable of permitting full unrestricted fluid flow therethrough.

An additional object of the invention is to provide a valve member for conduit systems utilizing a frangible valve element wherein positive sealing is assured, and complete opening of the valve element readily accomplished.

A further object of the invention is to provide a valve member fitting utilizing a frangible valve element wherein removal of the valve element may be readily produced by unskilled personnel, and wherein the valve element may be retained in place until a full interconnection between the fitting coupling parts is achieved to prevent leakage and spillage.

An additional object of the invention is to provide a valve member fitting which may be used with a sealed precharged conduit wherein operation of a single actuator removes valve elements from the passages of both fitting and conduit to simultaneously establish communication between the conduit systems of the coupled parts.

A further object of the invention is to provide a valve member fitting for a refrigeration system wherein the valve fitting functions as a mounted base valve, as well as serving to seal the conduit system associated with the base valve.

Yet an additional object of the invention is to provide a sealed plug for a precharged conduit which is of a diameter no larger than the conduit diameter, which is economical to produce and install, leak proof, and readily associated with a valve member having an actuator for removing a valve element from the conduit plug.

In the practice of the invention a valve member body, preferably constituting a base valve for a refrigeration system, includes an axial passage having a plug sealed therein which includes a valve element extending over the passage to close the same. The valve element is attached to a sleeve by means of a frangible web. The valve body includes a radially movable actuator or ram in the form of a screw wherein radial displacement thereof engages the valve element and forces the same in a radial direction fracturing the web. The severed valve element falls into a retainer defined on the valve body offset with respect to the passage wherein the valve element does not interfere with the fluid flow through the valve body. The valve body includes conduit attachment means wherein a conduit is mounted thereon in communication with the body passage.

Preferably, a precharged conduit is associated with the valve body, and sealingly connected thereto. The conduit end is sealed by a plug of a diameter no greater than that of the conduit and including an axially extending valve element connected by a frangible web to a sleeve portion. When fully attached to the valve body, the conduit valve element aligns with the valve body actuator, and the valve elements of the valve body and conduit are removed with a single operation of the valve element actuator.

BRIEF DESCRIPTION OF THE DRAWINGS

The aforementioned objects and advantages of the invention will be understood from the following description and accompanying drawings wherein:

FIG. 1 is an elevational, diametrical, sectional view of a valved member fitting in accord with the invention, the valve element being in the sealed position, FIG. 2 is an end elevational view of the valve body as taken from the left of FIG. 1, FIG. 3 is an elevational, diametrical, detail, cross sectional view of the valve body illustrating the valve element in the partially removed position, FIG. 4 is an elevational, detail, diametrical, cross sectional view similar to FIG. 3 illustrating the valve element within the retainer and prior to retraction of the actuator, FIG. 5 is an elevational view, partially in diametrical section, of a precharged conduit end in accord with the invention, and FIG. 6 is an elevational, diametrical, cross sectional view of a valve member fitting and precharged conduit assembled thereto in accord with the invention, prior to fracture of the valve elements.

DESCRIPTION OF THE PREFERRED EMBODIMENT

The valve member body 10 includes a generally rectangular portion 12 having a passage 14 defined therethrough. The body 10 preferably constitutes a base valve for a refrigeration circuit, such as an air conditioning system, the base valve being mounted upon the compressor-condensor unit. Mounting of the base valve is by means of screws threaded into holes 16, FIG. 2, defined in portion 12. Conduit means, not shown, communicate with the passage 14 at the left, FIG. 1.

The valve body 10 also includes a conduit connection portion 18 consisting of an exteriorly threaded neck 20 adapted to receive a threaded connector nut 22. A tubular ferrule 24 is located within nut 22, and cooperates with the nut and conical surface 26 wherein tightening of the nut upon a conduit being received within ferrule 24, as shown in dotted lines at 28, establishes a sealed relationship between the valve body and the conduit in the known manner.

A stem 30 is mounted upon the valve body 10 in a radial manner, being received within the shouldered radial bore 32 and brazed therein. The stem 30 is provided with exterior threads whereby a protective cap, not shown, may be threaded thereon to seal the outer end of the stem. Internally, the stem is provided with a threaded bore 34 extending therethrough, and near its end the stem bore is provided with a groove receiving snap ring 36. An actuator or screw 38 having a ram portion 40 is threaded within bore 34, and includes a socket 42 for receiving an Allen screw or the like whereby the screw may be rotated to produce radial displacement. Clockwise rotation of the screw moves the squared forward ram end 44 thereof into the passage 14 for removing the frangible valve element as will be described.

A dish-shaped valve element retaining receptacle 46 is mounted on the valve element body in opposite diametrical relation to the stem 30. The receptacle 46 is brazed or soldered to the valve body concentric to the radial valve body opening 48 which is of a diameter slightly less than that of the receptacle. If desired, a charge port 50 may be mounted on the valve body 10 in communication with passage 14, and such charge port is of conventional design.

Sealing of the valve body passage 14 is produced by a plug 52 which includes a cylindrical sleeve 54 which is soldered, brazed or otherwise affixed within the passage 14 in a sealed manner. A cylindrical disc-like valve element 56 is mounted upon an end of the sleeve 54 by means of an annular frangible web 58. The plug 52 is preferably formed of metal, and the valve element 56 includes an outer cylindrical peripheral surface 60 which is in radial alignment with the screw 38 and end 44 thereof.

In use, a conduit 28 is inserted into the ferrule 24, as shown in dotted lines, until passage shoulder 62 is engaged, the nut 22 is then tightened on threads 20 to compress the ferrule upon the conduit to establish a sealed relationship between the conduit and valve body 10. At this time, the operator may desire to evacuate the conduit 28 and charge the same with refrigerant through the charge port 50, and introduce a refrigerant into the conduit, assuming that the conduit is not of the precharged type, as later described.

Upon the nut 22 being fully tightened, the operator inserts an Allen wrench, or the like, into the screw socket 42 and rotates the screw 38 in a clockwise direction moving the end 44 radially into contact with the valve element surface 60. Continued rotation of the screw 38 radially displaces the valve element 56 downwardly as shown in FIG. 3, and such radial displacement results in the fracturing of the frangible web 58, and upon sufficient displacement of the valve element occuring the valve element will fall from the sleeve 54 into the retainer 46 as shown in FIG. 4.

Such removal of the valve element 56 from the sleeve fully opens the passage 14 establishing a nonrestrictive flow between valve body 10 and conduit 28, and the screw 38 is then rotated in a counter clockwise direction until the screw fully retracts and engages the snap ring 36. At this time a threaded cap, not shown, may be mounted upon stem 30 in sealed relationship to prevent any loss of refrigerant through the stem. Full retraction of the screw removes the screw and ram from the passage 14 assuring full flow through the valve body.

The valve body 10 is mounted upon its support by means of screws or bolts within threaded holes 16 in such a manner that the retainer 46 is located at the lower portion of the valve body, and thus the severed valve element 56 will be held within the retainer by gravity. The operator will hear the valve element striking the retainer 46, and will therefore be advised as to when the screw 38 may be retracted, and it is advisable that the screw be threaded radially inwardly until engagement with the shoulder of bore 32 to insure that the valve element 56 has been completely removed from the sleeve 54.

The concepts of the invention permit an improved plug to be associated with precharged conduits, and such improved plug constructions are shown in FIGS. 5 and 6.

The precharged conduit 64, usually constituting a copper tube, includes an end 66 lying within a plane perpendicular to the longitudinal axis of the conduit adjacent the end. The plug 68 includes a cylindrical sleeve portion 70 closely received within the conduit bore, and a radial shoulder 72 engages the conduit end to insure the proper depth of insertion of the sleeve portion into the conduit. The sleeve portion is brazed or soldered on the end of the conduit so as to form a sealed connection therewith.

As will be appreciated from FIG. 5, the outer diameter of the sleeve portion as represented at 74 is substantially in alignment with the outer diameter of the conduit 64, and it is desired that this diameter substantially correspond to the conduit outer diameter, or be of slightly less diameter. A valve element 76 of disc configuration is mounted upon the sleeve 70 by a frangible web 78, and the valve element axially extends from the sleeve providing a cylindrical peripheral surface 86 which is radially accessible. Thus, it will be appreciated that the plug 68 tightly seals the end of the conduit 64, permitting the conduit to be precharged with a refrigerant, and a concise plug is associated with the conduit end.

The valve body shown in FIG. 6 for receiving the precharged conduit of FIG. 5 is substantially identical to that described in FIG. 1, and primed reference numerals are employed for corresponding components. Valve body 10' does not include a shoulder 62 for engaging the conduit, and the conduit 64 may be inserted through the ferrule 24' until the valve element 76 engages the valve body valve element 56' as shown in FIG. 6. Thereupon, the nut 22' is tightened to establish a sealed relationship between the valve body 10' and the conduit 64.

Rotation of the screw 38' forces the ram end 44' radially inward, and as the illustrated diameter of valve element 56' is greater than the diameter of valve element 76 the screw will first engage the surface 60', and engage the valve element surface 86 after radial deformation and partial fracture of the valve element web 58' has occurred. Continued rotation of the screw 38' will then simultaneously displace both valve elements 56' and 76 toward the retainer 46', and radial movement of the screw continues until both valve elements are completely severed from their associated sleeves and fall into the retainer. Thereupon, the screw 38' is retracted to clear the screw from the passage 14′ wherein unrestricted flow through the valve body can occur.

In the disclosed embodiment, the passage of the sleeve 74 is of lesser diameter than the passage of sleeve 54′. However, the conduit 64 may be of such diameter so that such passages are equal, and it is not necessary that there be a difference in diameter of the valve elements 56′ and 76. The valve elements may be of equal diameter to produce simultaneous initial displacement relative to their associated sleeve, and the necessary force may be readily produced by the screw 38′ for displacing both valve elements simultaneously.

Utilizing the precharged conduit 64 with the valve body of the invention permits a precharged refrigeration circuit to be assembled with the inclusion of very little air, and the cost of manufacture of the valve body 10 or 10′, and conduit plug 68 is less than previous constructions, yet, superior flow characteristics are achieved due to the absence of restrictions between the coupling parts.

It is appreciated that various modifications to the inventive concepts may be apparent to those skilled in the art without departing from the spirit and scope of the invention.

I claim:

1. A frangible closure valve comprising, in combination, a hollow body having a passage defined therethrough having an axis, inlet and outlet port means defined on said body in communication with said passage, a valve element within said body sealingly associated with said passage and sealing said passage against fluid flow therethrough, frangible means supporting said valve element within said body, valve element release means mounted upon said body in radial alignment with said valve element for displacement transverse to said passage axis for engaging and releasing said element from said frangible means by fracture to open said passage to fluid flow, and valve element retaining means defined on said body receiving said valve element after fracture of said frangible means.

2. In a frangible closure valve as in claim 1, said valve element comprising a circular disc having a periphery, said frangible means comprising a circumferential web defined at said disc periphery supporting said element within said body passage.

3. In a frangible closure valve as in claim 2, a tubular sleeve coaxially sealed within said passage, said web being sealingly connected to said sleeve.

4. In a frangible closure valve as in claim 3 wherein said valve element, web and sleeve comprise a homogeneous member.

5. In a frangible closure valve as in claim 1 wherein said valve element release means comprises a ram mounted on said body radially displacable within said passage.

6. In a frangible closure valve as in claim 5, a threaded bore radially defined in said body intersecting said passage, said release means including a screw threaded into said bore, said ram being mounted upon said screw.

7. In a frangible closure valve as in claim 1, said valve element retaining means being radially off-set with respect to said passage whereby said valve element is removed from said passage after fracture of said frangible means.

8. In a frangible closure valve as in claim 7, said body including an upper portion and a lower portion, said valve element release means being defined in said body upper portion and said valve element retaining means comprising a dish shaped receptacle defined in said body lower portion vertically below said release means.

9. A frangible closure fluid coupling comprising, in combination, first and second coupling body parts each having a fluid conducting passage defined therein having an axis, connection means defined on at least one of said parts interconnecting said parts in coaxial passage alignment, first and second valve elements sealing said passages of said first and second parts, respectively, said valve elements being disposed adjacent each other and in axial alignment, frangible means supporting said valve elements upon the associated body part, and valve element release means mounted on one of said parts in radial alignment with both of said valve elements and selectively displacable transversely to the axes of said passages for engagement with said valve elements to fracture said frangible means and remove said valve elements from the associated passage.

10. In a frangible closure fluid coupling as in claim 9 wherein said valve elements are of different radial dimension to produce sequential engagement by said release means and reduce the force necessary to fracture said frangible means.

11. In a frangible closure fluid coupling as in claim 9, valve element retaining means defined on said one part receiving said valve elements after fracture of said frangible means.

12. In a frangible closure fluid coupling as in claim 11, said one part including an upper portion and a lower portion, said valve elements' release means being located on said one part's upper portion and said retaining means comprising a dish shaped receptacle defined on said one part's lower portion vertically below said release means receiving the fractured valve elements and retaining the same clear of said parts' passages.

13. In a frangible closure fluid coupling as in claim 9 wherein one of said parts comprises a tubular conduit having an end, the associated valve element being mounted upon said conduit at said end.

14. In a frangible closure fluid coupling as in claim 13, a tubular sleeve sealed within said conduit at said end thereof, said valve element associated with said conduit being frangibly mounted upon said sleeve.

15. In a frangible closure fluid coupling as in claim 9 wherein said valve element release means comprises a screw threaded into a radial threaded bore defined on said one body part.

16. In combination, a flexible conduit precharged with a pressurized refrigerant, said conduit having cylindrical inner and outer surfaces and ends, a tubular body comprising a tubular sleeve having an axial passage, an outer end, a cylindrical portion sealingly received within said conduit inner cylindrical surface and a shouldered portion having a radial shoulder engaging a conduit end, said shouldered portion having a cylindrical outer surface comprising the maximum dimension of said sleeve and of a diameter substantially equal to the diameter of said conduit outer surface, a valve element defined upon said sleeve outer end sealing said sleeve passage and axially extending from said sleeve outer end and radially exteriorly accessible, and a frangible web supporting said valve element upon said body.

17. In a combination as in claim 16, said valve element being of a cylindrical configuration having a radially accessible cylindrical peripheral surface.

* * * * *